US006405480B1

(12) United States Patent
Martin

(10) Patent No.: US 6,405,480 B1
(45) Date of Patent: Jun. 18, 2002

(54) FLUID INJECTION APPARATUS AND METHOD

(76) Inventor: Le Martin, P.O. Box 687, Chickasha, OK (US) 73023-0687

( * ) Notice: Subject to any disclaimer, the term of this patent is extended or adjusted under 35 U.S.C. 154(b) by 0 days.

(21) Appl. No.: 09/872,282

(22) Filed: May 30, 2001

(51) Int. Cl.[7] .............................................. A01G 29/00
(52) U.S. Cl. .......................... 47/57.5; 47/40.5; 47/42; 47/48.5
(58) Field of Search .................... 47/57.5, 40.5, 47/48.5, 58; 248/523, 146; 111/118

(56) References Cited

U.S. PATENT DOCUMENTS

| | | | |
|---|---|---|---|
| 2,044,063 A | * | 6/1936 | Dahlberg |
| 2,938,304 A | * | 5/1960 | Thomas et al. |
| 3,469,342 A | | 9/1969 | Morris |
| 3,920,393 A | | 11/1975 | Baynes et al. |
| 4,103,457 A | | 8/1978 | Carlisle |
| 4,126,963 A | | 11/1978 | Dunbar |
| 4,693,419 A | * | 9/1987 | Weintraub ................ 239/63 |
| 4,825,587 A | * | 5/1989 | Stancil ................... 47/40.5 |
| 4,951,416 A | * | 8/1990 | Gutridge .................. 47/62 |
| 5,016,389 A | | 5/1991 | Odom, Jr. |
| 5,355,620 A | * | 10/1994 | Newbanks ................ 47/58 |
| 5,369,910 A | | 12/1994 | Copenhaver |
| 5,428,348 A | * | 6/1995 | Gault ..................... 340/618 |
| 5,515,646 A | * | 5/1996 | Newbanks ................ 47/57.5 |
| 5,699,635 A | * | 12/1997 | Nitta ..................... 47/57.5 |
| 5,791,082 A | | 8/1998 | Finello |
| 5,860,247 A | | 1/1999 | Newby |
| 5,937,574 A | * | 8/1999 | Jacques ................... 47/40.5 |

FOREIGN PATENT DOCUMENTS

JP    4004229115 A  *  8/1992  .......... A01G/27/00

* cited by examiner

Primary Examiner—Charles T. Jordan
Assistant Examiner—Andrea M. Valenti

(57) ABSTRACT

A fluid injection apparatus and associated method for supplying a pressurized fluid to a permeable portion of a tree. A fluid injection apparatus comprising a receptacle engageable with the tree forms a chamber around the permeable portion of the tree. A reservoir supplies fluid to a pump which selectively transfers the fluid from the reservoir to the chamber, pressurizing the fluid in the chamber. A tree stand comprising a tree clamp and supporting legs can comprise the fluid injection apparatus. The apparatus enables the method of supplying a pressurized fluid to the permeable portion of a tree comprising: providing a fluid-retaining chamber around a permeable portion of the tree; providing a reservoir containing a supply of the fluid; and selectively pumping the fluid from the reservoir to pressurize the chamber.

13 Claims, 4 Drawing Sheets

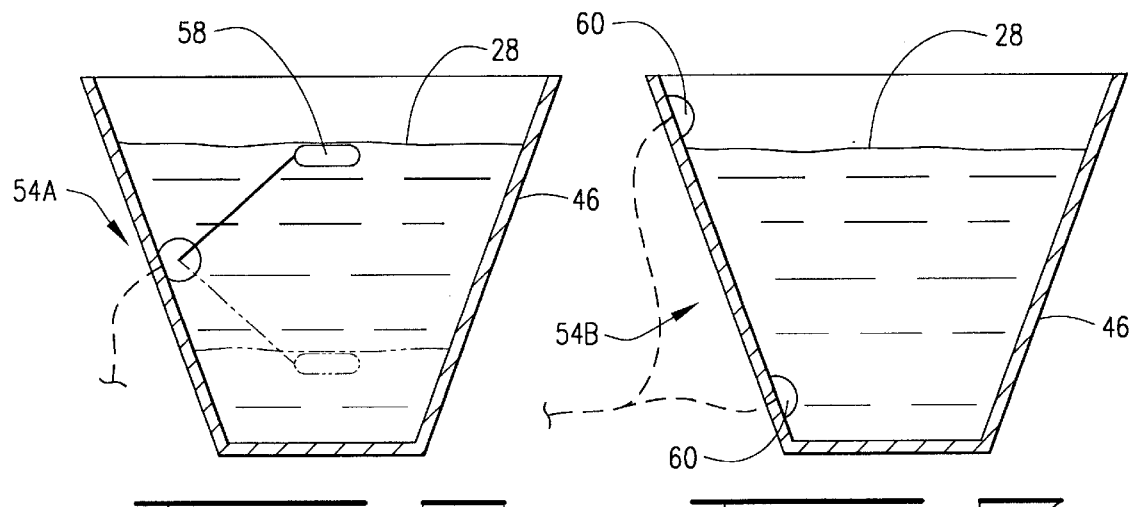
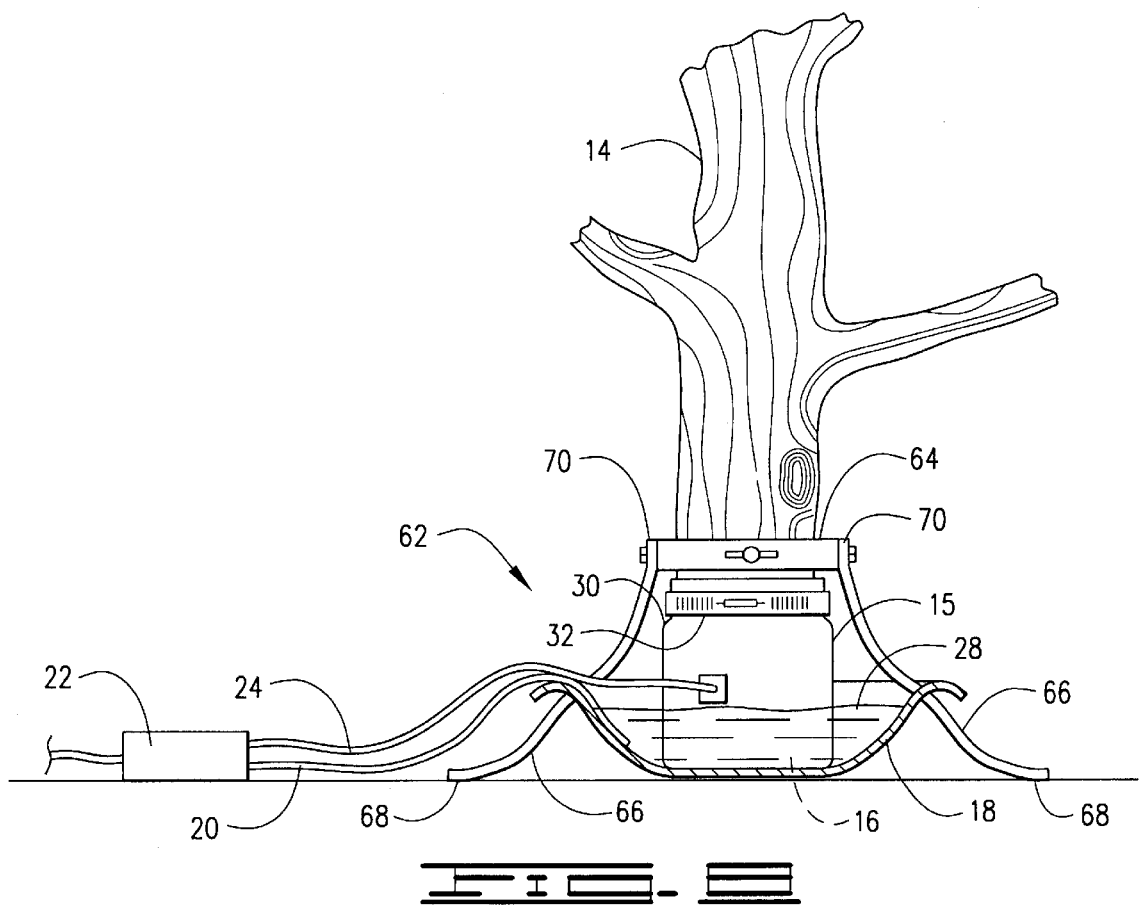

FLUID INJECTION APPARATUS AND METHOD

FIELD OF THE INVENTION

This invention relates generally to the field of fluid injection apparatuses and associated methods for hydrating plants, and more particularly but not by way of limitation, to a fluid injection apparatus and method for supplying a pressurized fluid to a cut end of a tree.

BACKGROUND OF THE INVENTION

Live Christmas trees are commonly cut transversely across a lower portion of the trunk and erected within a tree stand for enjoyment during the Christmas season. Cutting the trunk severs the sap carrying capillaries otherwise connected to the root system for delivering sap to the tree's living cell structure. Although cut, the end of the tree is nevertheless somewhat permeable to the ingestion of a fluid into the sap carrying capillaries. If the cut end, or "permeable portion," is not immersed in a fluid such as water the tree will very quickly dry out and become an extremely dangerous fire hazard. The likelihood of the tree burning increases when commonplace decorations on the Christmas tree include electrical components and/or candles.

Typically, the cut end of the Christmas tree is placed into a reservoir that is fillable with a nutrient fluid such as water. A freshly cut tree will absorb fluid initially, but the amount absorbed quickly diminishes. Generally, within a few days a Christmas tree arranged to absorb fluid through the cut end (permeable portion) will in fact take in a relatively small amount of the fluid, not enough to prevent the drying out process. The result is that even a Christmas tree in water will nevertheless become a dangerous fire hazard in just a matter of days.

Some freshly cut trees that are grown in temperate conditions are dry enough to burn. But even trees initially too green to burn when cut will begin drying out immediately after being cut. Within the normal timeframe associated with shipment and sale the tree usually has dried out to the point it must be handled as a fire hazard when brought into the home. It has been determined that by providing a pressurized fluid supply to the permeable portion of the cut tree that substantially more fluid can be injected into the sap carrying capillaries and circulated through the tree than that which is possible by absorption. By pressurized fluid injection the drying out process can be prevented to the extent that the Christmas tree remains too green to burn for a period of time longer than that traditionally associated with the indoor display of the Christmas tree. It is to this improvement that the present invention is directed.

SUMMARY OF INVENTION

The present invention provides an apparatus and an associated method for supplying a pressurized fluid to a permeable portion of a tree. One aspect of the invention provides a fluid injection apparatus comprising a receptacle engageable with the tree forming a chamber around the permeable portion of the tree. The fluid injection apparatus further comprises a reservoir in fluid communication with the chamber. A pump selectively transfers the fluid from the reservoir to the chamber, pressurizing the fluid in the chamber.

In this aspect of the fluid injection apparatus the chamber is pressurized directly by the pumping action of the pump. A fluid return line can be provided to return fluid from the chamber to the reservoir. In another aspect of the fluid injection apparatus the chamber is pressurized by the head pressure of a column of fluid pumped from the reservoir into an elevated accumulator and gravity fed into the chamber.

In another aspect of the present invention a tree stand is provided for supporting a tree and delivering a supply of pressurized fluid to the tree. The tree stand comprises a base comprising a clamp grippingly engaging a portion of the tree and a plurality of legs having a first end supportable on a planar surface and a second end supporting the clamp so as to support the tree on the planar surface. The base supports a fluid injection apparatus comprising a receptacle supported by the base and engageable with the tree forming a chamber around a permeable portion of the tree. The fluid injection apparatus further comprises a reservoir in fluid communication with the chamber and a pump selectively transferring the liquid from the reservoir to the chamber, pressurizing the fluid in the chamber.

In another aspect of the present invention a method is provided for supplying a pressurized fluid to a tree. First, a fluid-retaining chamber is provided around a permeable portion of the tree. Second, a reservoir containing a supply of the fluid is provided in fluid communication with the chamber. Third, the fluid is pumped from the reservoir to pressurize the chamber. Additionally, the fluid can be selectively pumped to vary the fluid pressure in the chamber.

BRIEF DESCRIPTION OF THE DRAWINGS

FIG. 5 is a diagrammatical schematic representation of a fluid injection apparatus constructed in accordance with the embodiment of FIG. 4.

FIGS. 6 and 7 are diagrammatical representations of the fluid control in the accumulator of FIG. 4; FIG. 6 illustrates a liquid float; and FIG. 7 illustrates a pair of liquid contact switches.

FIG. 8 is an elevational representation of a tree stand constructed in accordance with the present invention comprising a fluid injection apparatus similar to that of FIG. 1.

DETAILED DESCRIPTION OF THE PREFERRED EMBODIMENTS

Figure 1:
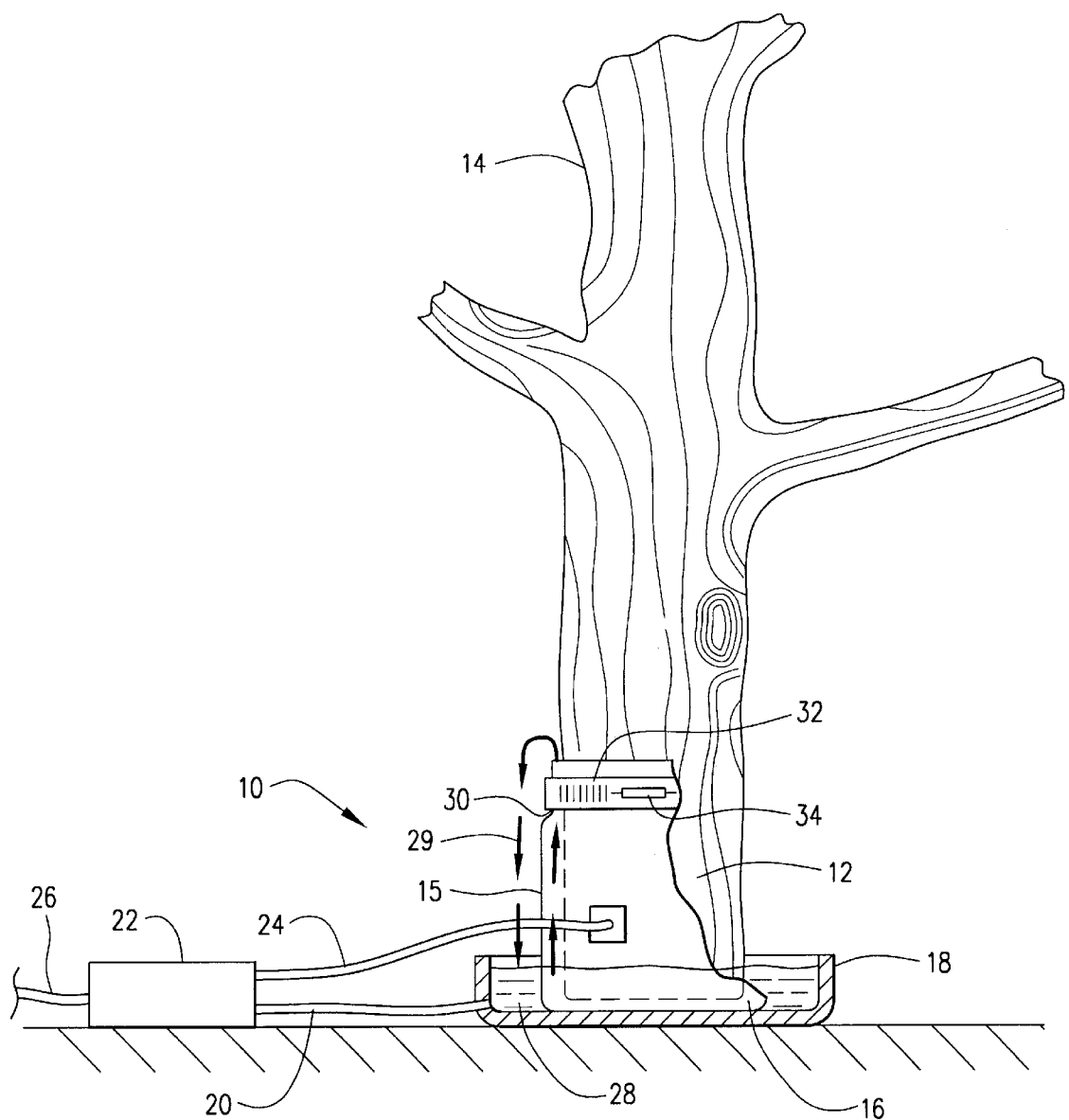
FIG. 1 is an elevational representation of a fluid injection apparatus constructed in accordance with an embodiment of the present invention with the sleeve partially cutaway for clarity sake to show the cut end of a tree (permeable portion) receivingly disposed therein.

Referring to the drawings in general, and more particularly to FIG. 1 which illustrates a fluid injection apparatus 10 constructed in accordance with an embodiment of the present invention to supply a pressurized fluid to a permeable portion 12 of a tree 14. As used herein, "permeable portion" means any portion of a plant, such as the tree 14, that will absorb or otherwise provide a passageway for fluid into the sap carrying capillaries for supporting the tree's living cell structure. The tree 14 of FIG. 1 and the following discussion, for example, will accept fluid into the cut end of the trunk for this purpose. The use of the fluid injection apparatus contemplated herein adapted for the cut end of a tree trunk is illustrative, not limiting of the scope of the present invention. Alternatively, for example, the permeable portion of a plant can be all or some portion of a plant's root structure or a notched or pierced portion of the trunk or stem. Modifications to the preferred embodiment to adapt alternatively to different plants and/or to different permeable portions of said plants are within the knowledge of a skilled artisan and a thorough recitation of all variations is therefore not necessary for an understanding of the present invention.

The tree injection apparatus 10 comprises a receptacle 15 that is engageable with the tree 14 to form a chamber 16 around the permeable portion 12. In FIG. 1, for example, where the permeable portion 12 is the cut end of the trunk, the receptacle can be fashioned of an annular sleeve with a closed end and an opposing open end forming a longitudinal cavity that receivingly engages the permeable portion 12. A gap between the inner surface of the sleeve and the tree constitutes the chamber 16 which is fillable with the fluid to be injected into the tree.

The fluid injection apparatus 10 further comprises a reservoir 18 in fluid communication with the chamber 16. For example, a conduit 20 fluidly connects the reservoir 18 and a pump assembly 22, which, in turn, is fluidly connected to the chamber 16 by a conduit 24. The pump assembly 22 comprises a conventional motorized pump (shown below) that is connectable to a power supply by line 26 to selectively transfer a fluid 28 from the reservoir 18 to the chamber 16, thereby pressurizing the fluid 28 in the chamber 16.

In order to pressurize the fluid 28 in the chamber 16, the receptacle 15 partially or substantially sealingly engages the tree. In some cases it is preferable to permit a desired amount of pressurized fluid 28 to weep from the chamber 16. For example, a certain amount of weepage can reduce the complexity and associated cost of sealingly engaging the receptacle 15 against the tree.

Also, where the reservoir 18 is positionable beneath the tree 14, then permitting a certain amount of weepage along a weepage flow path 29 can provide a relatively simple and inexpensive manner of varying the fluid pressure in the chamber 16 (hereinafter "chamber pressure"). The weepage flow path 29 extends from the chamber 16, between the receptacle 15 and the tree 14 by force of the chamber pressure, and to the reservoir 18 by force of gravity. For example, the pump assembly 22 can be selectively activated, such as in response to a timing interval and/or a pressure reading, to pressurize the chamber 16. Once a desired chamber pressure is obtained, the pump assembly 22 can be deactivated and the chamber pressure can decay in relation to the weepage rate of the fluid 28 from the chamber 16. This cyclic pressurizing of the chamber 16 can be advantageous in extending and enhancing the living structure of the tree 14, by simulating the cyclic "ebb and flow" of fluid intake by a tree in the natural state.

The receptacle 15 is therefore necessarily engageable with the tree 14 to provide a partial or substantial sealing engagement therewith. Preferably the receptacle 15 is engageable with a number of different sizes and shapes of trees. One way of accommodating such variations is to fashion the receptacle 15 as comprising an elastomeric member at the open end of the sleeve which is compressingly engageable against the tree 14. The sleeve portion of the receptacle 15 can alternatively be entirely comprised of such an elastomeric material.

In FIG. 1 the sleeve has an elastomeric upper portion 30 forming a relatively smaller inner diameter than the outer diameter of the tree trunk, such that the elastomeric member 30 is operatively stretched over the trunk and thereby compressingly engages the tree 14. The elastomeric member 30 can comprise conventional strengthening and shape retaining features such as formed ribs and/or integral bands (not shown) to enhance the compressing engagement in a conventional manner.

Such an overlapping compressing engagement of the elastomeric member 30 will provide a relatively minimal resistance to weepage of pressurized fluid 28 from the chamber 16. To further restrict the weepage the tree injection apparatus 10 can further comprise a closure member 32 urging the elastomeric member 30 against the tree. For example, the closure member 32 of FIG. 1 illustrates the use of an annular clamp that is closeable around the elastomeric member 30.

For even more control in restricting the amount of weepage, the closure member 32 can comprise an adjustment member 34 that is selectively positionable between a first position and a second position. At the first position a relatively lower compressing force is imparted to the elastomeric member 30 so as to result in a desired weepage rate of pressurized fluid 28 from the chamber 16. Alternatively, at the second position a relatively higher compressing force is imparted to the elastomeric member 30 so as to result in a substantially fluid-tight chamber 16. The closure member 32 of FIG. 1 illustrates the use of a conventional hose clamp that is closeable around the elastomeric member 30 by advancing the threaded member (adjustment member 34).

Thus, the pump assembly 22 transfers fluid 28 from the reservoir 18 and pressurizes the chamber 16 around the permeable portion of the tree 14. A conventional timer can be used to activate the pump assembly 22 periodically, and the chamber pressure can be varied by permitting a pressure release, such as by a weepage of the fluid from the chamber 16. Clearly, even in the absence of weepage the chamber pressure will decay in accordance with the fluid intake of the tree 14.

Figure 2:
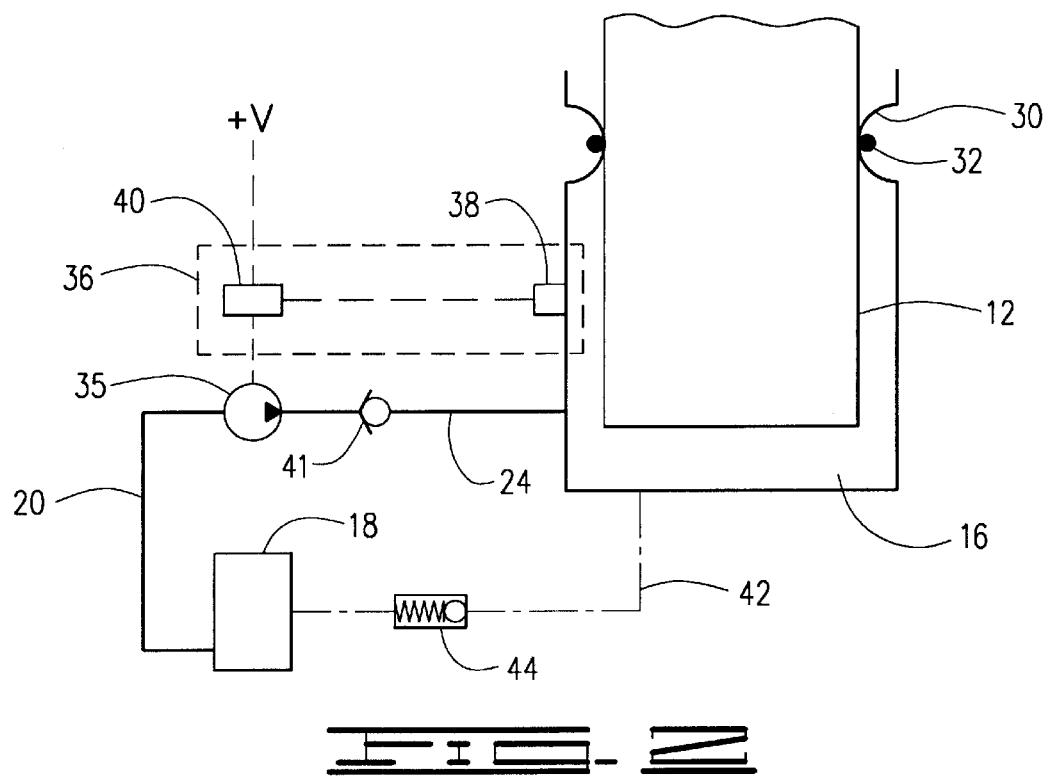
FIG. 2 is a diagrammatical schematic representation of a fluid injection apparatus constructed in accordance with the embodiment of FIG. 1.

Additionally, the pump assembly 22 can comprise a controller in order to more precisely vary the chamber pressure. For example, FIG. 2 illustrates a schematic representation of the fluid injection apparatus 10 of FIG. 1, wherein a pump 35 is controlled by a controller 36. The controller 36 comprises a pressure sensor 38 determining the chamber pressure. The controller 36 furthermore comprises a switch 40 responsive to the pressure sensor 38 in activating the pump 35 by switching the pump relative to a power supply +V. The switch 40 generally activates the pump 35 in response to the chamber pressure to maintain the chamber pressure above a selected pressure. For example, the pressure switch 40 can conventionally comprise a timer relay (not shown) that activates the pump 35 for a selected interval when the chamber pressure drops to a selected pressure. Alternatively, the switch 40 can, in a conventional manner, activate the pump 35 in response to a selected first chamber pressure and deactivate the pump 35 when the chamber pressure increases to a selected second pressure, thereby maintaining the chamber pressure within a selected pressure range.

Figure 3:
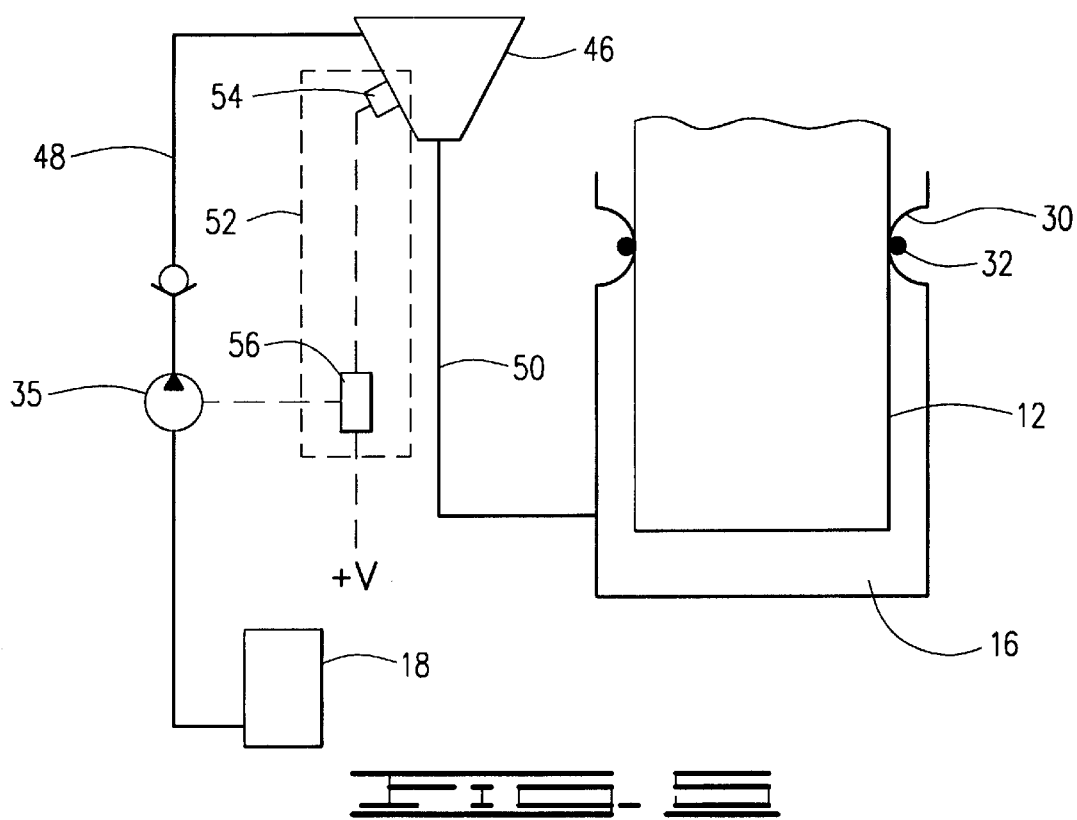
FIG. 3 is an elevational representation of an alternative fluid injection apparatus in accordance with the present invention wherein the fluid reservoir is remotely disposed from the sleeve.
Figure 3:
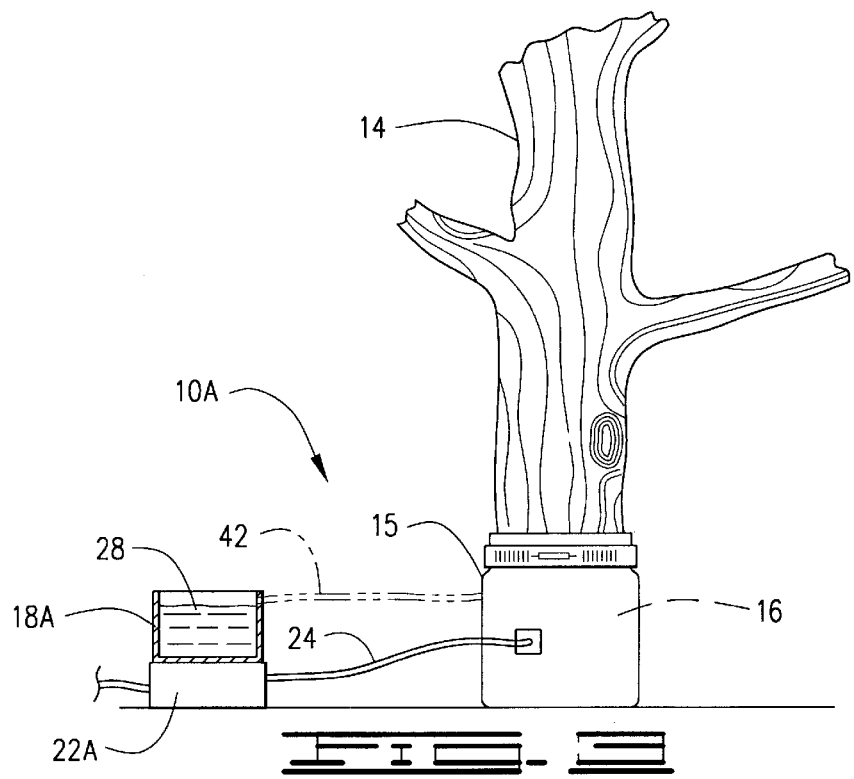

FIG. 2 illustrates schematically the conduit 20 from the reservoir 18 to the pump 35, and the conduit 24 from the pump 24 to the chamber 16. A conventional check valve 41 can be used in fluid communication with the conduits 20, 24 to prevent reverse flow of the fluid 28 when the pump 35 is deactivated. FIG. 2 also illustrates an alternative embodiment wherein a conduit 42 (shown in a phantom line) fluidly connects the chamber 16 with the reservoir 18. Such a return line back to the reservoir 18 can be used when the reservoir 18 is located remotely from the receptacle 15. FIG. 3, for example, illustrates a fluid injector apparatus 10A wherein the reservoir 18A (shown in cross section) is remotely disposed relative to the receptacle 15. The return line 42 (shown in phantom lines) can return fluid 28 from the chamber 16 to the reservoir 18 such as when a continuous flow of pressurized fluid 28 is desired through the chamber 16, or when an overpressure condition exists in the chamber 16. Returning momentarily to FIG. 2, a pressure responsive valve 44 can be used to return fluid 28 from the chamber 16 to the reservoir 18 when the chamber pressure reaches a selected pressure.

Figure 4:
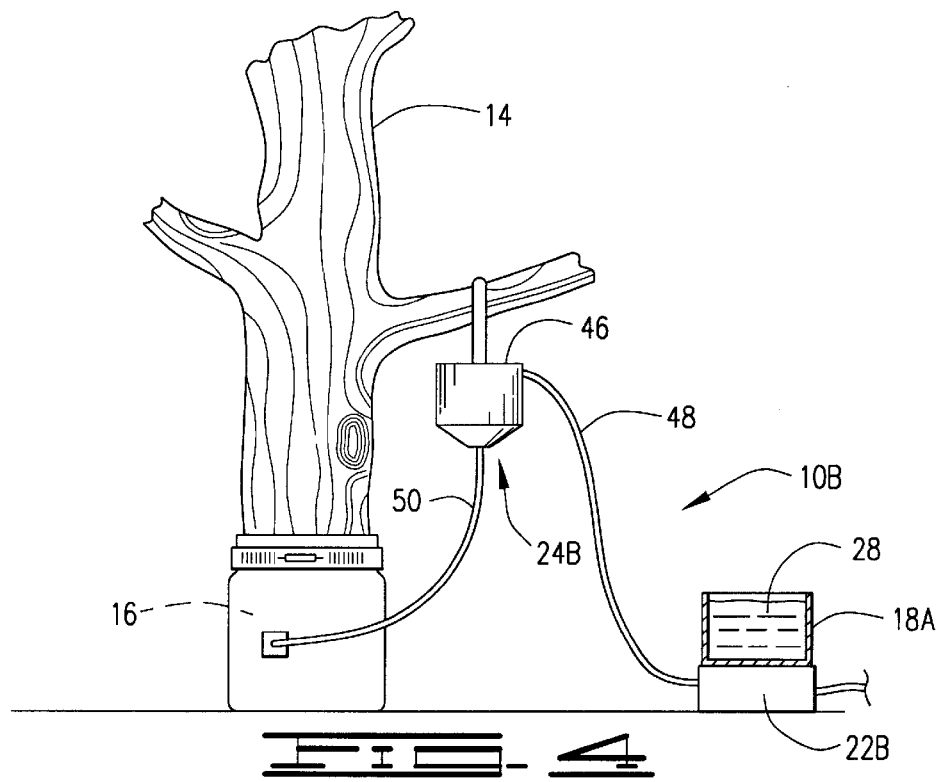
FIG. 4 is an elevational representation of an alternative fluid injection apparatus in accordance with the present invention wherein the pump transfers fluid from the reservoir to an accumulator, the fluid being gravity fed from the accumulator to the sleeve.

Turning now to FIG. 4 which illustrates a fluid injection apparatus 10B constructed in accordance with another embodiment of the present invention wherein the conduit 24B from the pump assembly 22B to the chamber 16 comprises an accumulator 46. The pump assembly 22B delivers fluid 28 from the reservoir 18A to the accumulator 46 by a first portion 48 of the conduit 24B, and the fluid 28 flows from the accumulator 46 to the chamber 16 by a second portion 50 of the conduit 24B. Preferably the fluid 28 is gravity fed from the accumulator 46 to the chamber 16. Accordingly, the chamber pressure is related to the level of fluid 28 in the accumulator 46, which imparts a corresponding head pressure to the chamber 16.

FIG. 5 illustrates schematically a fluid injector apparatus constructed in accordance with the embodiment of FIG. 4, illustrating further a controller 52 to selectively activate the pump 35 in response to the fluid 28 level in the accumulator 46. The controller 52 generally determines the level of fluid 28 in the accumulator 46 and selectively activates the pump 35 to transfer fluid 28 from the reservoir 18 to the accumulator 46. For example, in FIG. 5 the controller 52 comprises a fluid level indicator 54 for determining the fluid 28 level in the accumulator 46. The controller 52 furthermore comprises a switch 56 that is responsive to the fluid level indicator 54 for selectively switching power to the pump 35. FIGS. 6 and 7 illustrate two conventional fluid level indicators 54 that are well suited for use in the present invention. In FIG. 6 the fluid level indicator 54A comprises a conventional liquid level float 58 that rises and falls with the fluid 28 level in the accumulator 46. FIG. 7 illustrates an alternative embodiment where the fluid level indicator 54B comprises one or more liquid contact switches 60 that signal when the fluid 28 level immerses the switches 60.

Turning now to FIG. 8 which illustrates a tree stand 62 for supporting the tree 14 and delivering a supply of pressurized fluid 28 to the tree 14 in a manner described hereinabove. The tree stand 62 comprises a base comprising a clamp 64 supportingly gripping the tree 14 and a plurality of legs 66. Each leg has a first end 68 supportable upon a substantially planar surface and a second end 70 supporting the clamp 64 so as, in combination, to support the tree 14 upon the planar surface. The tree stand furthermore comprises a fluid injection apparatus constructed in accordance with that described hereinabove. That is, a receptacle 15 is supported by the base and engageable with the tree 14 forming a chamber 16 around a permeable portion of the tree 14. A reservoir 18 is disposed in fluid communication with the chamber 16. A pump assembly 22 20 selectively transfers the fluid 28 from the reservoir 18 to the chamber 16, thereby pressurizing the fluid 28 in the chamber 16.

As described hereinabove, the receptacle 15 can comprise an elastomeric member 30 compressingly engageable against the tree 14. A closure member 32 can be used to urge the elastomeric member 30 to a pressing engagement against the tree 14. A controller can selectively activate the pump assembly 22 to vary the chamber pressure.

The fluid injector apparatus 10 described hereinabove makes possible the following novel method of supplying pressurized fluid to a tree 14. First, the method comprises the step of providing a fluid-retaining chamber 16 around a permeable portion of the tree 14. Second, a reservoir 18 of fluid 28 provides a supply of the fluid 28. Third, the method comprises the step of pumping the fluid from the reservoir 18 to the chamber 16, pressurizing the chamber 16. Additionally, the method can comprise the step of selectively activating and deactivating the pumping step to vary the fluid pressure in the chamber 16.

It is clear that the present invention is well adapted to attain the ends and advantages mentioned as well as those inherent therein. While a presently preferred embodiment of the invention has been described for purposes of the disclosure, it will be understood that numerous changes may be made in the construction, operation and arrangement of the various elements, steps and procedures without departing from the spirit and scope of the invention as defined in the following claims.

What is claimed is:

1. A fluid injection apparatus for supplying a pressurized fluid to a permeable portion of a tree comprising:

a receptacle receivingly engageable with the tree defining a chamber enclosing the permeable portion of the tree, the receptacle comprising an elastomeric member compressingly engageable against a portion of the tree extending into the chamber;

a reservoir adapted for retaining a supply of the fluid in fluid communication with the chamber;

a pump selectively transferring the fluid from the reservoir to the chamber, increasing the fluid pressure in the chamber; and a closure member operably coupled to the elastomeric member comprising an adjustment member selectively positionable between a first position and a second position, whereat the first position a portion of the fluid exits the chamber and enters the reservoir along a weepage flow path between the elastomeric member and the tree, and whereat the second position the chamber is substantially fluid tight between the elastomeric member and the tree.

2. The fluid injection apparatus of claim 1 further comprising a controller selectively activating the pump to vary the fluid pressure in the chamber.

3. The fluid injection apparatus of claim 2 wherein the controller comprises:

a pressure sensor determining the fluid pressure in the chamber; and a switch responsive to the pressure sensor activating the pump and thereby maintaining the fluid pressure in the chamber above a selected pressure.

4. The fluid injection apparatus of claim 3 further comprising a timer responsive to the switch, selectively activating, in turn, the pump for a desired interval.

5. The fluid injection apparatus of claim 3 wherein the switch activates the pump in response to a selected first chamber pressure and deactivates the pump in response to a selected second chamber pressure, maintaining the chamber pressure within a selected pressure range.

6. The fluid injection-apparatus of claim 1 wherein the pump transfers the fluid from the reservoir to the chamber in a first conduit, and wherein the fluid injection apparatus further comprises a second conduit returning the fluid from the chamber to the reservoir.

7. The fluid injection apparatus of claim 1 wherein the pump transfers the fluid from the reservoir to the chamber in a conduit, the conduit comprising an accumulator receiving a desired volume of fluid from the reservoir and maintaining the fluid disposed at an elevation substantially above the elevation of the chamber.

8. The fluid injection apparatus of claim 7 further comprising a controller to control the fluid level in the accumulator, comprising:
- a fluid level indicator determining the fluid level in the accumulator; and
- a switch responsive to the fluid level indicator activating the pump to transfer fluid from the reservoir to the accumulator.

9. The fluid injection apparatus of claim 8 wherein the fluid level indicator comprises a float switch.

10. The fluid injection apparatus of claim 8 wherein the fluid level indicator comprises a fluid contact switch.

11. A fluid injection apparatus for supplying a pressurized fluid to a permeable portion of a tree comprising:
- a receptacle engageable with the tree forming a chamber around the permeable portion of the tree;
- a reservoir adapted for retaining a supply of the fluid in fluid communication with the chamber;
- a pump selectively transferring the fluid from the reservoir to the chamber in a first conduit, pressurizing the fluid in the chamber; and
- a second conduit returning the fluid from the chamber to the reservoir, wherein the second conduit comprises a pressure responsive member returning a flow of fluid above a selected chamber pressure.

12. A tree stand for supporting a tree and delivering a supply of pressurized fluid to the tree, the tree stand comprising:
- a base, comprising:
    - a clamp grippingly engageable with a portion of the tree; and
    - a plurality of legs having a first end supportable on a planar surface and a second end supporting the clamp so as to support the tree on the planar surface; and
- a receptacle supported by the base and receivingly engageable with the tree defining a chamber enclosing a permeable portion of the tree, the receptacle comprising an elastomeric member compressingly engageable against a portion of the tree extending into the chamber;
- a reservoir in fluid communication with the chamber;
- a pump selectively transferring the fluid from the reservoir to the chamber, increasing the fluid pressure in the chamber; and
- a closure member operably coupled to the elastomeric member comprising an adjustment member selectively positionable between a first position and a second position, whereat the first position a portion of the fluid exits the chamber and enters the reservoir along a weepage flow path between the elastomeric member and the tree, and whereat the second position the chamber is substantially fluid tight between the elastomeric member and the tree.

13. The tree stand of claim 12 further comprising a controller selectively activating the pump to vary the fluid pressure in the chamber.

* * * * *